E. M. WHEELOCK.
TRACTION WHEEL FOR MOTOR PROPELLED VEHICLES.
APPLICATION FILED JULY 23, 1913.
1,142,470.  Patented June 8, 1915.
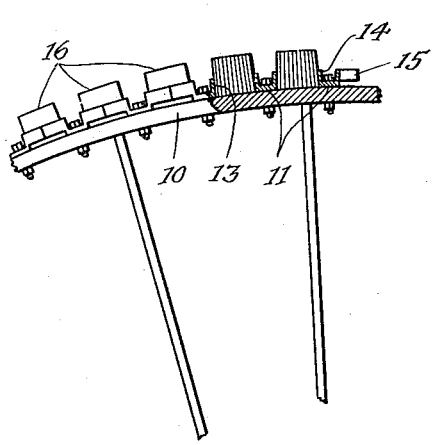
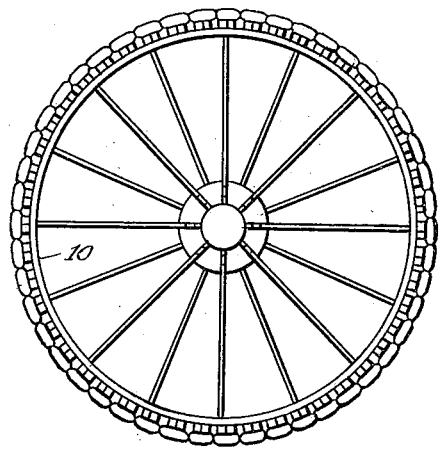
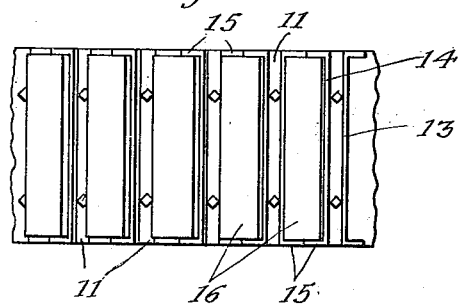
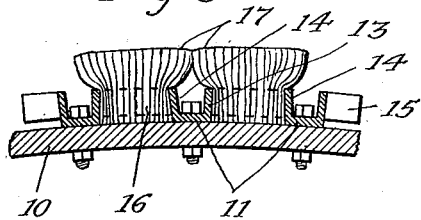
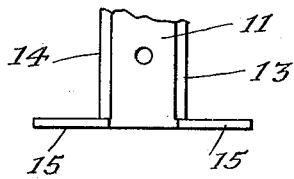
Witnesses:
Inventor:
Edwin M. Wheelock
By his Attorney.

UNITED STATES PATENT OFFICE.

EDWIN M. WHEELOCK, OF WINONA, MINNESOTA.

TRACTION-WHEEL FOR MOTOR-PROPELLED VEHICLES.

1,142,470.  Specification of Letters Patent.  Patented June 8, 1915.

Application filed July 23, 1913. Serial No. 780,688.

*To all whom it may concern:*

Be it known that I, EDWIN M. WHEELOCK, a citizen of the United States, residing at Winona, in the county of Winona and State of Minnesota, have invented certain new and useful Improvements in Traction-Wheels for Motor-Propelled Vehicles, of which the following is a specification.

My invention relates to traction wheels for motor propelled vehicles and has for its object to provide a wheel having a bearing surface which shall be to a degree yielding and pliable and which may be renewed at moderate expense, and yet which does not involve the use of rubber or pneumatic means.

I accomplish this object by removably securing upon the face of the tire a series of blocks of wood, employing holding means therefor which permit a portion of the wood to extend beyond the holding means. These blocks of wood will be so extended in the direction of the grain of the wood and when used for a short time will broom out at the top, forming a practically continuous bearing surface for the wheel of wood fibers.

The full objects and advantages of my invention will appear in connection with the detailed description thereof and are particularly pointed out in the claim.

In the drawings, illustrating the application of my invention in one form,—Figure 1 is a side view of a traction wheel having my improved bearing surface. Fig. 2 is a similar view on a larger scale of a portion of a traction wheel showing the wooden blocks in position before the same have been broomed at the ends. Fig. 3 is a sectional view on a still larger scale through a portion of the rim of a wheel showing the blocks of wood as they will appear in cross section after brooming. Fig. 4 is a plan view of the parts shown in Fig. 2. Fig. 5 is a large plan view of one of the holding devices.

The rim 10 of the traction wheel, which may be the drive wheel of a traction engine or of a motor truck or other motor propelled vehicle, is provided with a series of apertures, preferably in pairs, across the face of the tire. To each pair of these apertures is bolted a holding member 11, such as shown in detail in Figs. 3 and 5. This holding member comprises the flat-bottom portion through which the bolts 12 extend and side flanges 13 and 14, said side flanges being extended at an angle slightly oblique to the base portion of the holding members. Each of the flanges 13 and 14 is provided at its end with a lip 15 extended outwardly from the center of the holding member in a plane at right angles to the flanges 13 and 14. The length of the holding members will be equal to the width of the tire, so that the lips 15 will come inside of the planes of the edges of the tire. The lips 15 are preferably of such length that when the two holding members 11 are bolted through adjacent pairs of holes to the wheel tire the adjacent lips 15 of the respective holders will contact, as shown in Figs. 2 and 4 and indicated in dotted lines in Fig. 3.

The flanges 13—14 and the lips 15 form a cup-like chamber inclosed at the sides and ends and open at the top, with side walls sloping upwardly toward one another. In the chambers so formed are set a series of blocks 16, which may be formed of lignum vitæ, gum or other wood, as desired. These blocks will be formed with beveled sides and of such size as just to fit within the cup-like chamber formed by the flanges and lips of the holding members, with the grain of the wood extending radially outward.

It will be obvious that in assembling such a wheel the holding members will be progressively bolted into position, each member being first engaged over the beveled base of a block 16 whereby said block is firmly and yet removably secured upon the face of the tire with a portion of the block extending outwardly beyond the limits of the flanges 13 and 14, as clearly indicated in Fig. 2. The holding members will be of such width in respect to the block 16 that after the wheel has been operated and the faces of said block are splintered and broomed down, as will speedily take place, the broomed-out ends of the respective blocks will contact laterally, as indicated at 17 in Fig. 3, with the result that a practically continuous surface of wooden fibers is provided for the bearing surface of the wheel. This has the resiliency and yielding characteristics familiarly recognized in block pavements and provides an admirable traction surface. Small particles of sand and earth will work in among the fibers of the wood, giving a bearing surface having excellent wearing characteristics and yet one which cannot harm pavements or roadways and which provides a highly efficient traction surface. The wooden blocks may be manufactured relatively very cheaply, and the wheel surface may be renewed at any time for a very small cost and without the necessity of the employment of skilled labor, anyone who can operate a wrench being capable of making the change.

The advantages of my invention will be apparent. For the heavier types of trucks and for traction engines the use of pneumatic tires is impracticable, if not a physical impossibility. Many forms of rubber and composition tires employed for trucks are not only very expensive but are short lived and can only be renewed by the application of additional tires of the same character and cost, while in traction engines the tractor surface has been obtained by the provision of metal lugs or teeth which have no resiliency, are destructive of roads and so injurious to pavements that their use thereon is generally forbidden, and which also are inefficient in soft ground. All of these deficiencies my tire aims to, and will overcome.

I claim:

A traction wheel comprising a circular rim, a series of holding members secured to the rim and severally spaced one from the other, and a series of wooden blocks having the grain running radially with respect to the wheel removably secured to said rim by said holding members and projecting outwardly beyond the limits thereof so that when the blocks are broomed out from the use of the wheel the broomed-out heads of the blocks will fill said spaces and adjacent heads will contact to form a continuous bearing surface for the wheel.

In testimony whereof I affix my signature in presence of two witnesses.

EDWIN M. WHEELOCK.

Witnesses:
H. A. BOWMAN,
ROBERT W. MUIR.

Copies of this patent may be obtained for five cents each, by addressing the "Commissioner of Patents, Washington, D. C."